J. YOUNG.
TRACTOR.
APPLICATION FILED JULY 14, 1920.
1,407,243.
Patented Feb. 21, 1922.
8 SHEETS—SHEET 6.
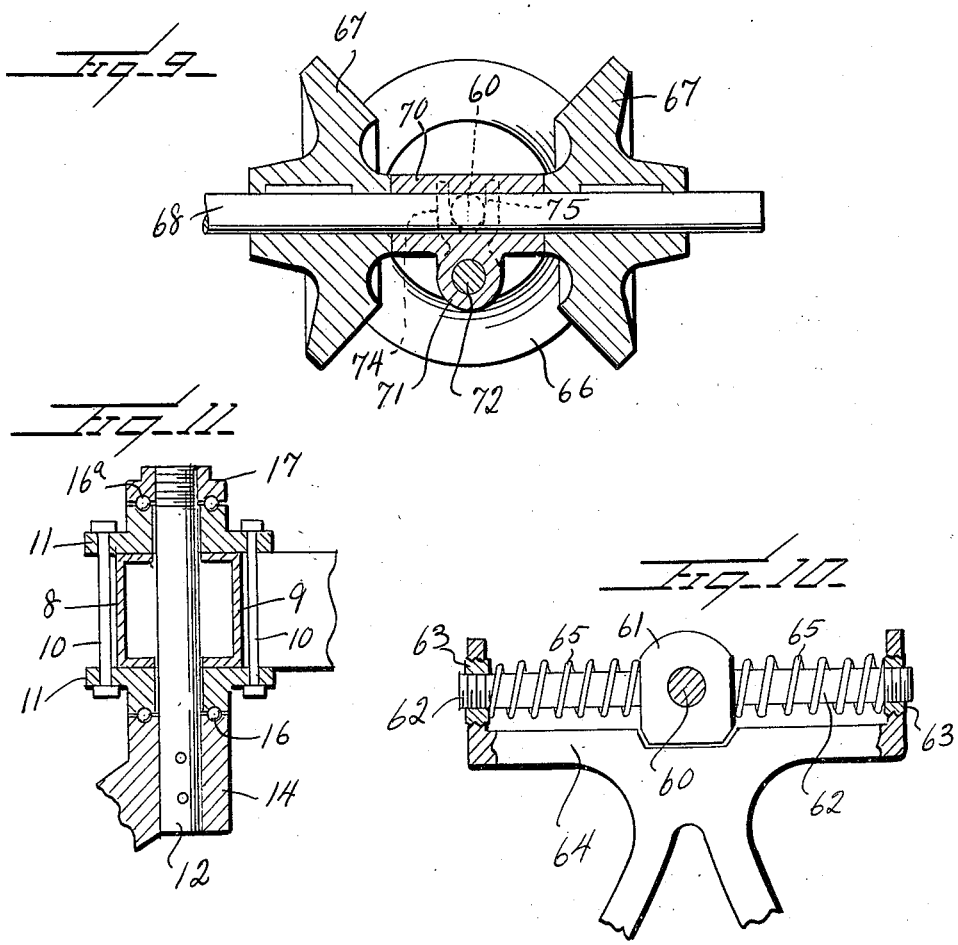
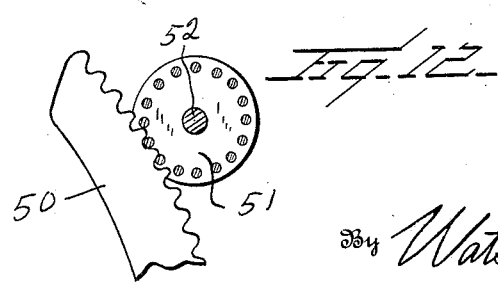
Inventor
J. Young
By Watson E. Coleman
Attorney

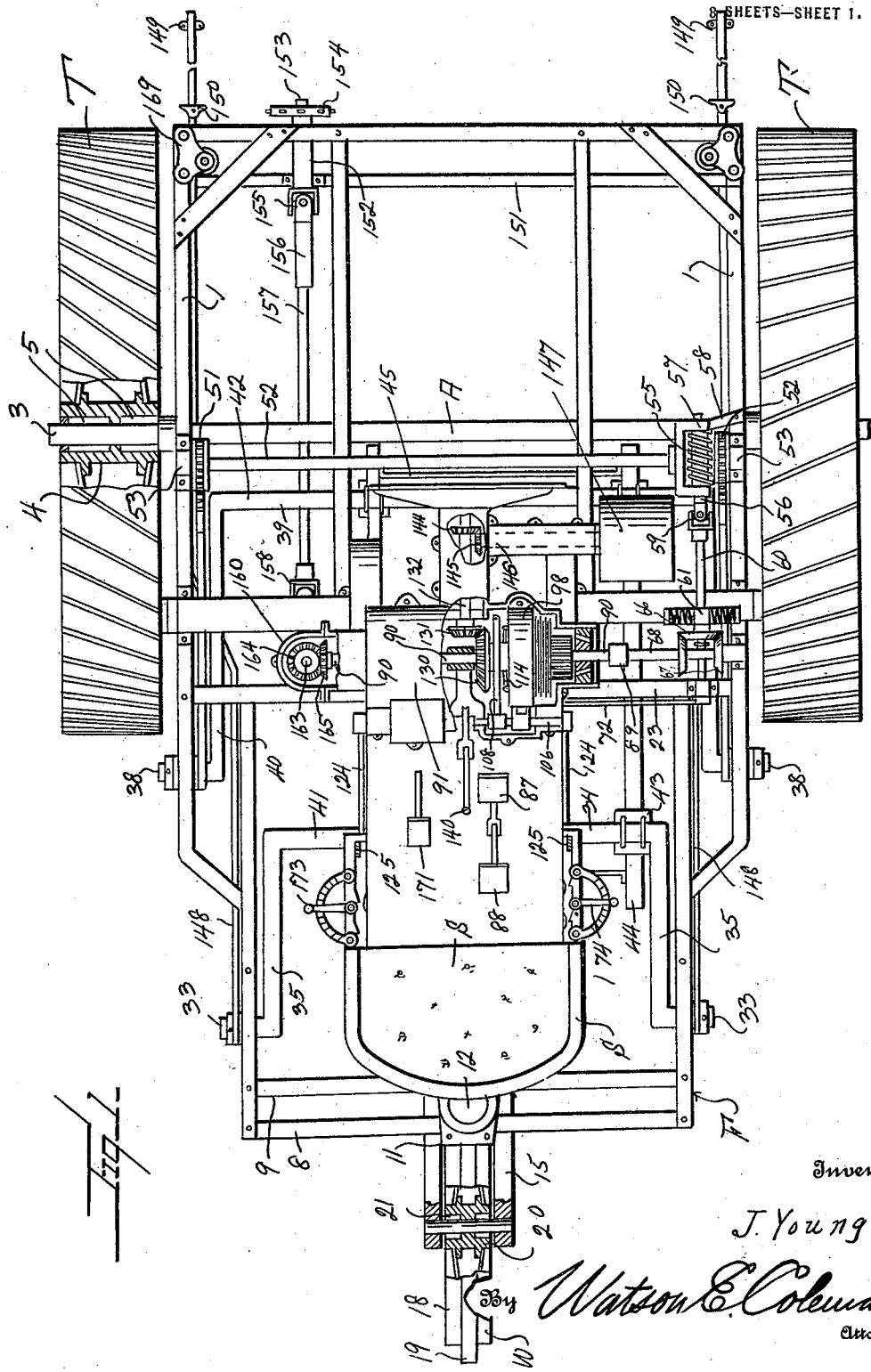

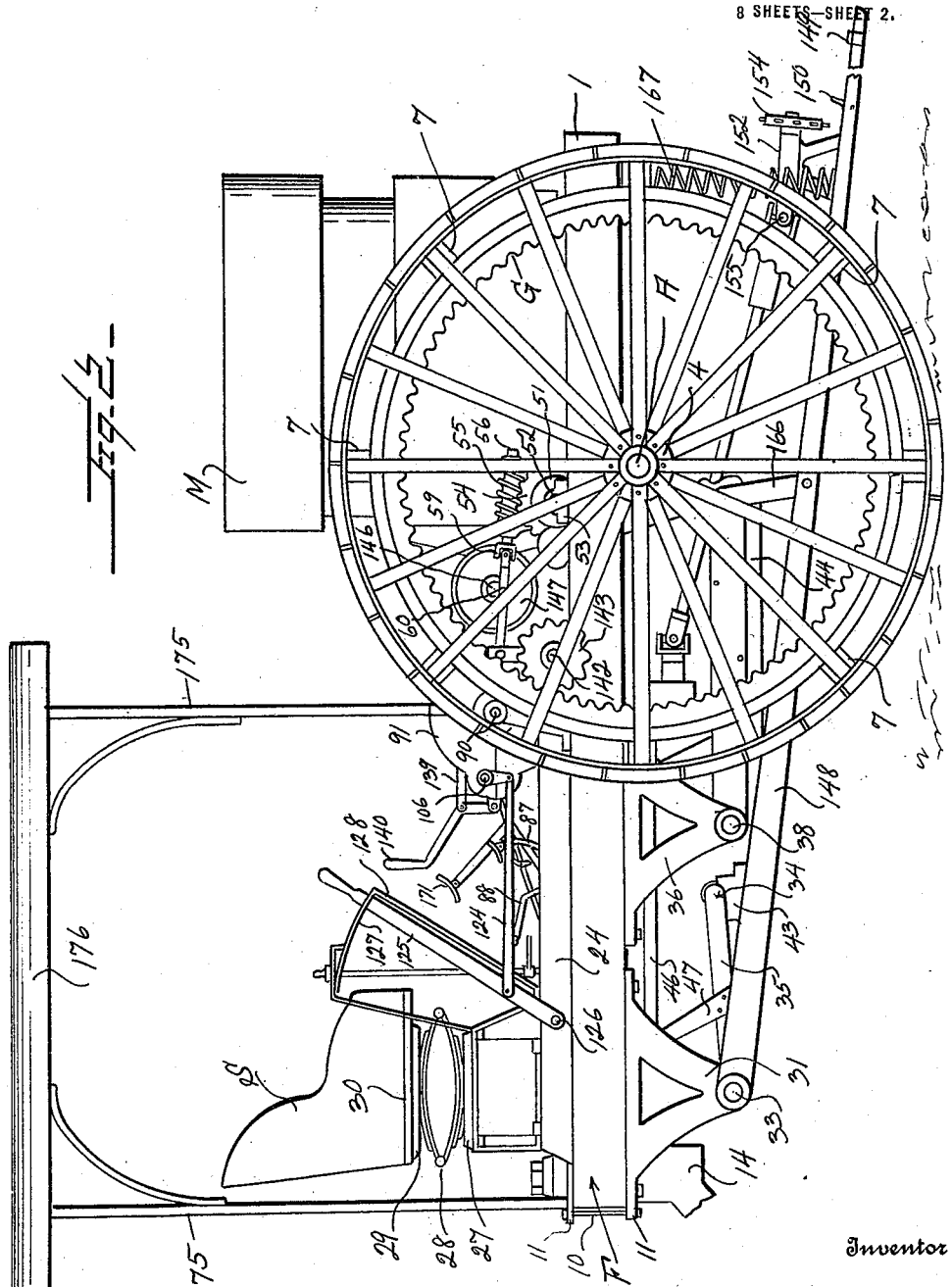

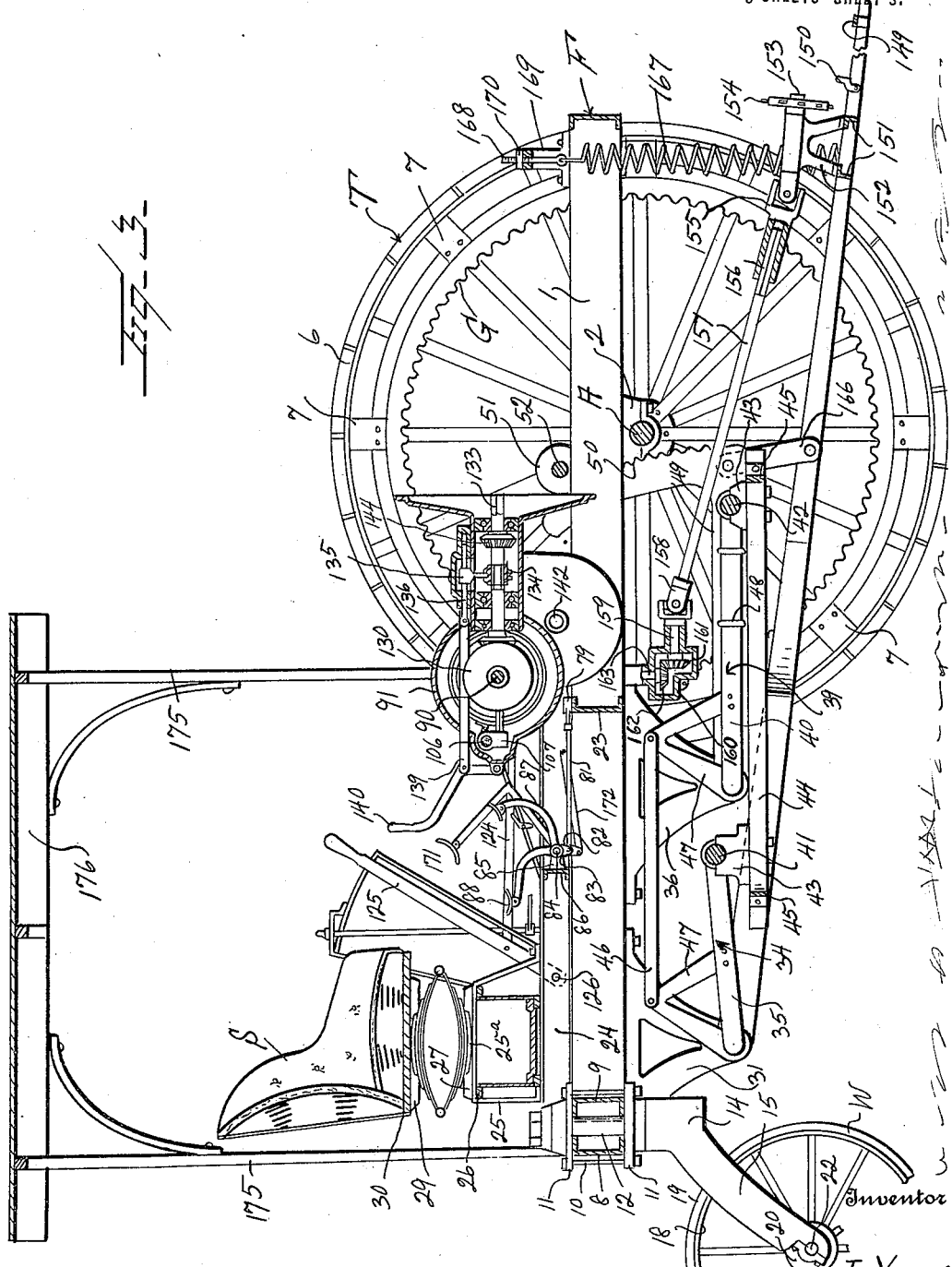

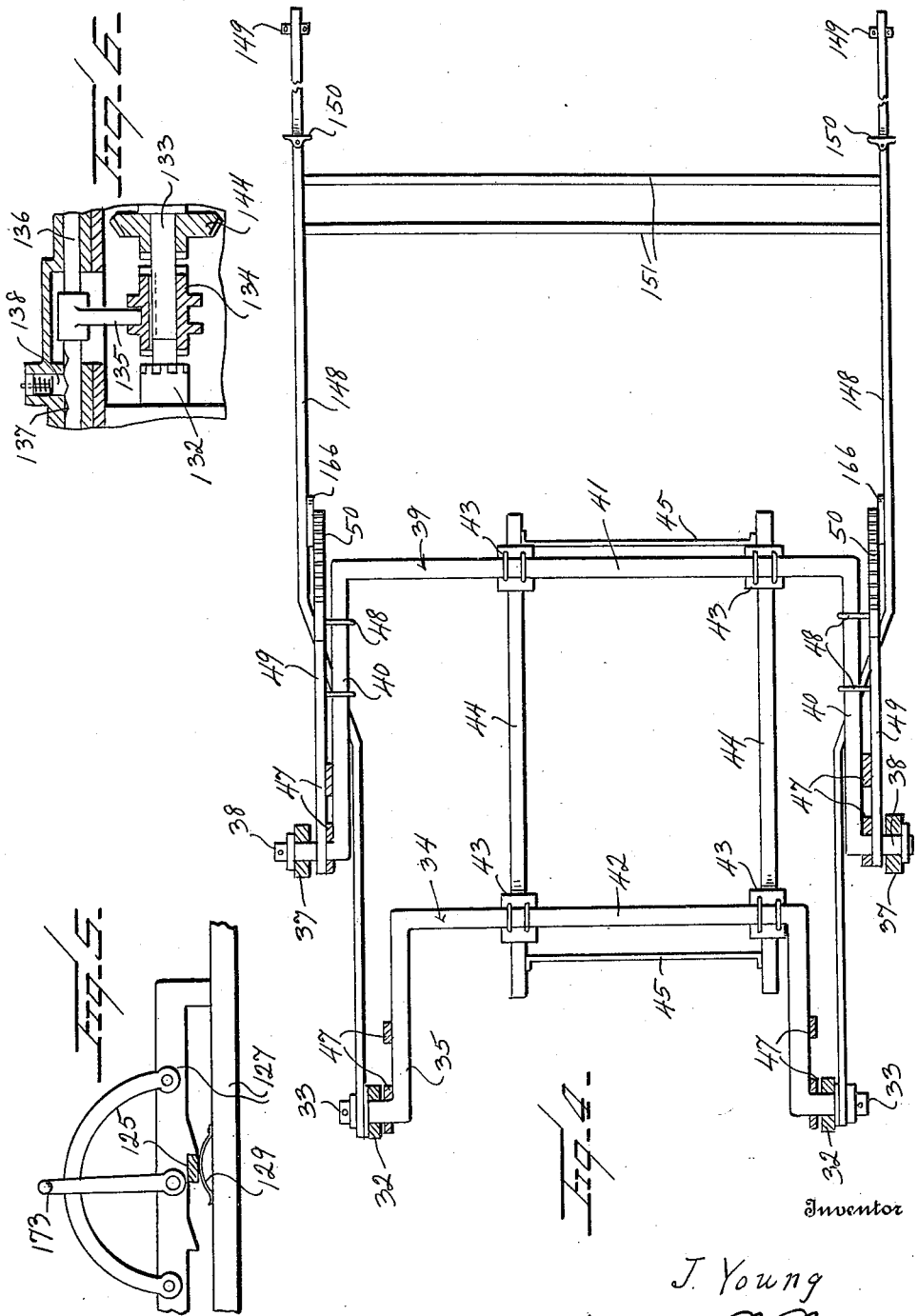

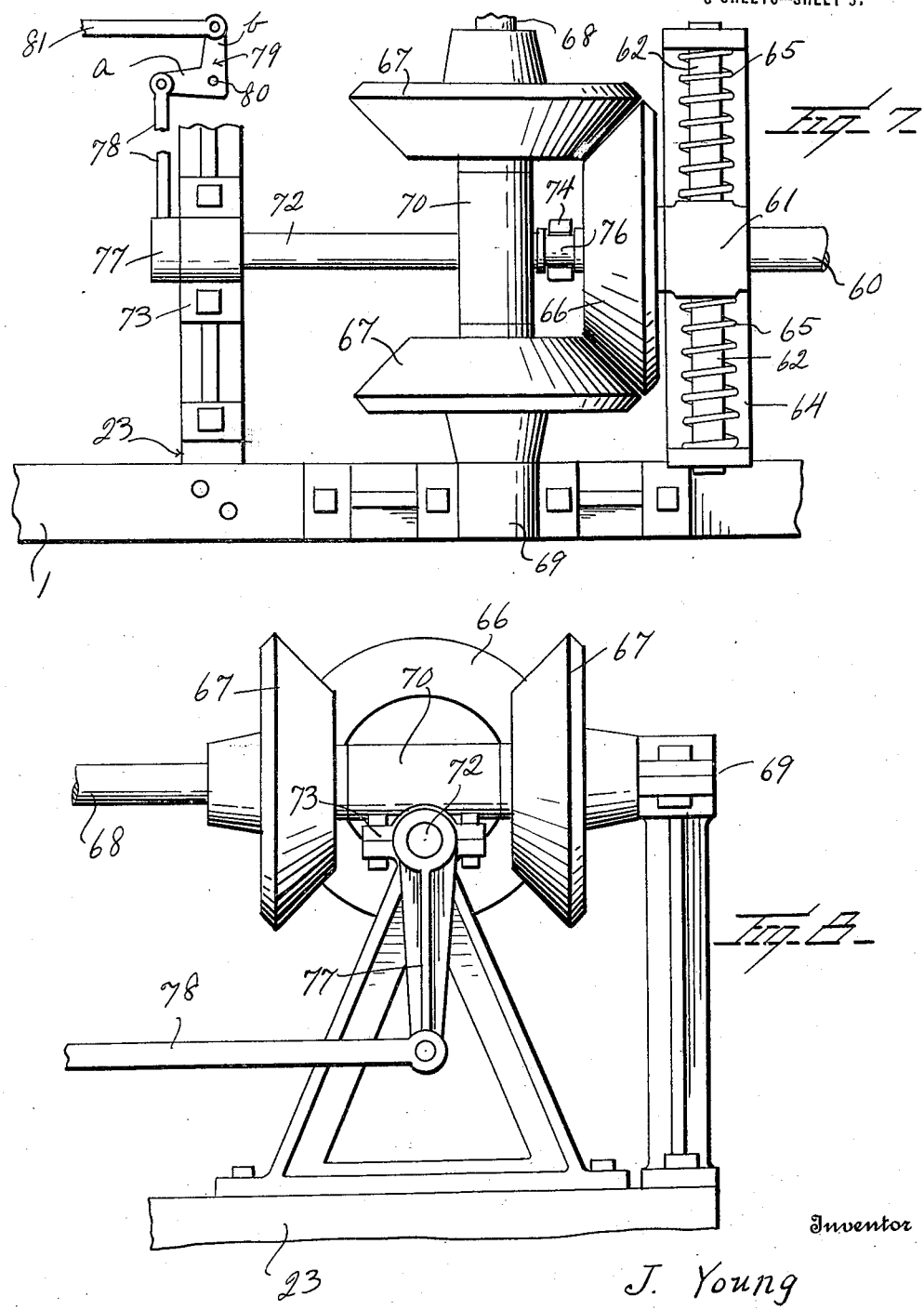

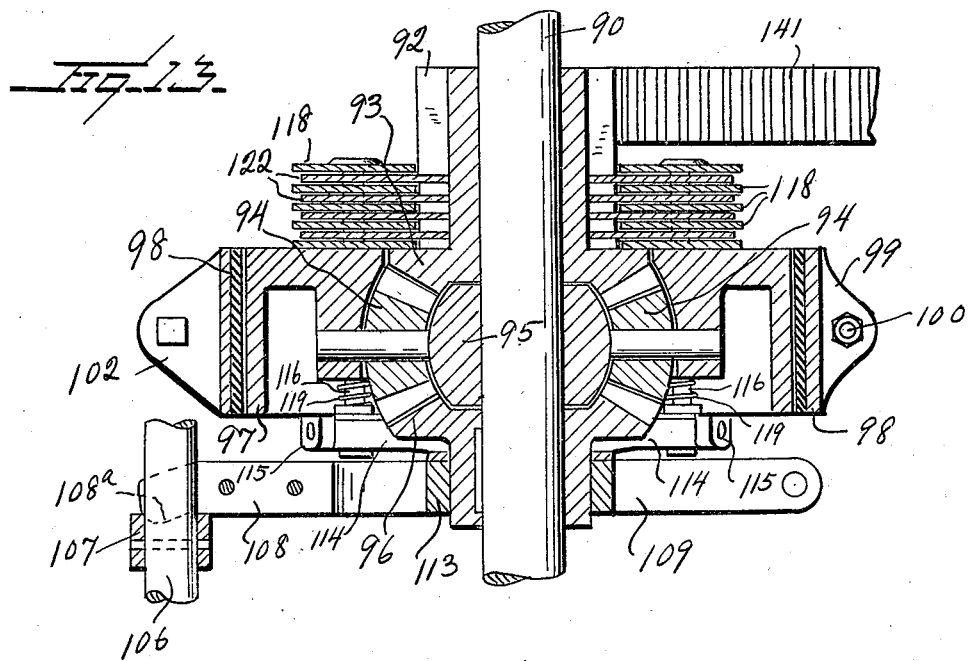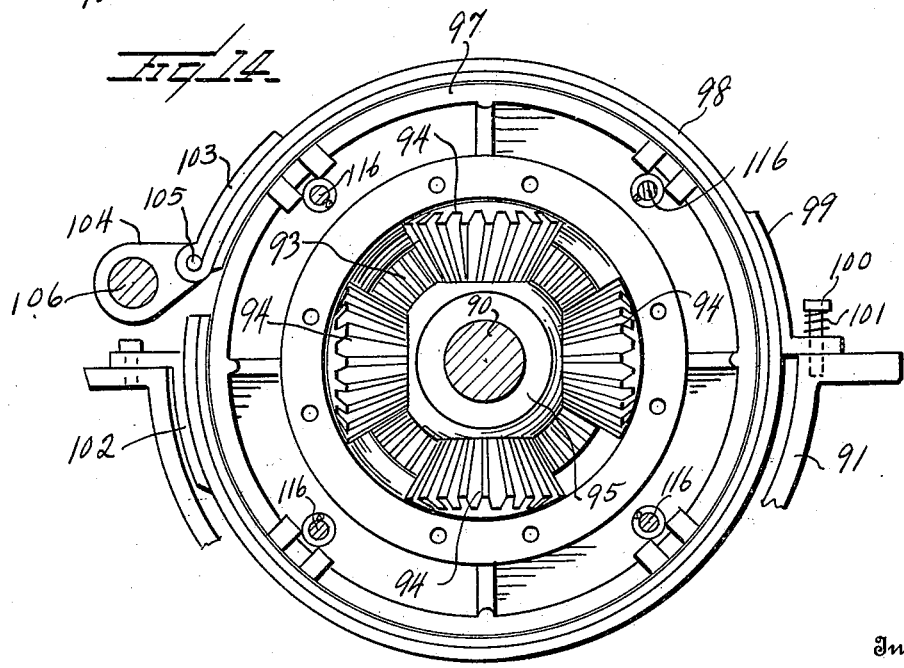

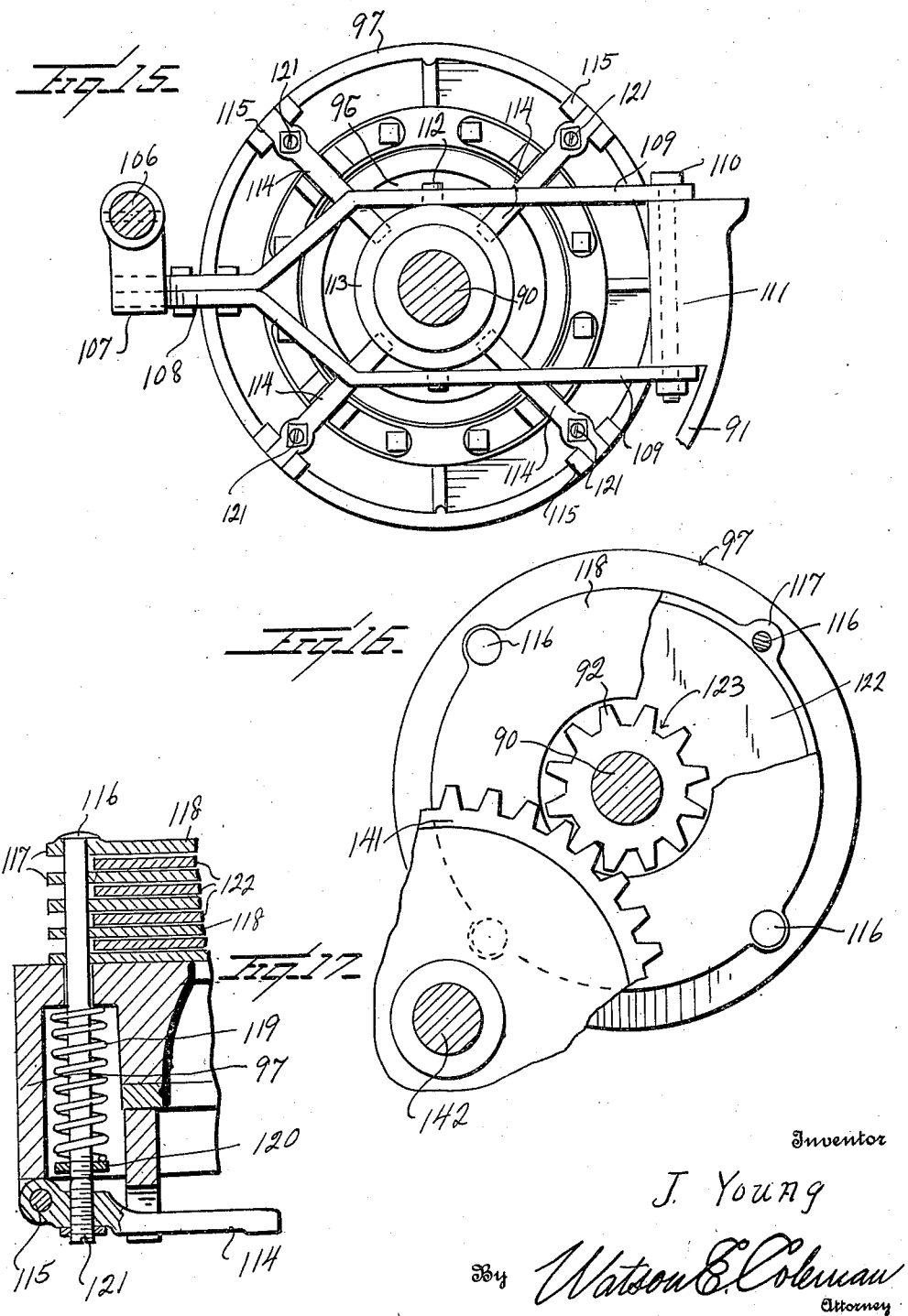

UNITED STATES PATENT OFFICE.

JACOB YOUNG, OF HENNESSEY, OKLAHOMA.

TRACTOR.

1,407,243.  Specification of Letters Patent.  Patented Feb. 21, 1922.

Application filed July 14, 1920. Serial No. 396,135.

*To all whom it may concern:*

Be it known that I, JACOB YOUNG, a citizen of the United States, residing at Hennessey, in the county of Kingfisher and State of Oklahoma, have invented certain new and useful Improvements in Tractors, of which the following is a specification, reference being had to the accompanying drawings.

This invention relates to certain improvements in tractors, and it is an object of the invention to provide a novel and improved device of this general character especially designed and adapted for use in connection with agricultural work.

Another object of the invention is to provide a device of this general character with novel and improved means whereby the same may be caused to turn short or make square corners and also wherein the direction of travel of the device is under control of the traction wheels, each of which being capable of rotation independently of the other.

A further object of the invention is to provide a novel and improved device of this general character including an underhung structure to which various farm implements are adapted to be attached, such as lister plows, disc harrows, or the like, together with means for raising or lowering said structure in accordance with the requirements of practice.

The invention consists in the details of construction and in the combination and arrangement of the several parts of my improved tractor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan with portions broken away of a tractor constructed in accordance with an embodiment of my invention.

Figure 2 is a fragmentary view in side elevation of my improved device as herein embodied.

Figure 3 is a view partly in longitudinal vertical section and partly in elevation of the device as herein disclosed.

Figure 4 is an enlarged view partly in top plan and partly in section illustrating in detail the mounting of the implement carrying frame and the hitch arms.

Figure 5 is an enlarged fragmentary view in top plan illustrating in detail the means for holding a controlling lever in its different positions.

Figure 6 is an enlarged fragmentary view partly in section and partly in elevation illustrating in detail the clutch means for connecting the driving shaft of the motor and the stub shaft coacting therewith.

Figure 7 is an enlarged fragmentary view in top plan illustrating the driven means for raising or lowering the implement carrying frame.

Figure 8 is a view in elevation of the structure illustrated in Figure 7.

Figure 9 is a fragmentary view partly in section and partly in elevation, the line of section being longitudinally of the shaft 68.

Figure 10 is a fragmentary view partly in section and partly in elevation illustrating in detail the mounting of the block 61.

Figure 11 is a fragmentary view partly in section and partly in elevation illustrating in detail the mounting of the shank of the rear caster wheel with the frame.

Figure 12 is an enlarged fragmentary view partly in elevation and partly in section illustrating the operative connection between the rack of a lifting arm and the coacting gear.

Figure 13 is an enlarged fragmentary view partly in horizontal section and partly in top plan illustrating in detail the construction of the transmission mechanism herein included.

Figure 14 is a view in side elevation of the structure as illustrated in Figure 13, with certain of the parts omitted.

Figure 15 is a view in side elevation of the structure as disclosed in Figure 13 and particularly illustrating the clutch release arm and the parts concomitant thereto.

Figure 16 is a view in end elevation of Figure 13 opposite to that shown in Figure 15, and Figure 17 is an enlarged fragmentary view partly in section and partly in elevation illustrating in detail certain of the structures embodied in the disc clutch mechanism.

As disclosed in the accompanying drawings, F denotes the main frame of my improved tractor of desired dimensions and configuration. The forward portion of the frame or more particularly the side members 1 thereof are provided with the transversely alined and depending bearings 2 which support the axle A.

The axle A extends beyond the opposite sides of the frame F, said extended portions constituting spindles 3 on each of which is mounted a tractor wheel T of any ordinary or preferred type. In order to facilitate the rotation of each of the wheels T, the hub 4 thereof has arranged therein the roller bearings 5 or other anti-friction means coacting with the adjacent spindle 3.

Carried by the inner marginal portion of the rim 6 of each of the wheels T is a plurality of inwardly disposed and circumferentially spaced brackets 7 to the inner end portions of which are bolted or otherwise secured the internal gear G concentric to the axial center of the wheel T.

The rear cross member or beam 8 comprised in the frame F has arranged in parallelism therewith a supplemental cross member 9 arranged inwardly thereof but in relatively close proximity thereto. This supplemental cross member 9 is secured at its opposite end portions to the side members 1 of the frame F.

Clamped above and below to the members 8 and 9 at substantially the transverse center of the frame F through the instrumentality of the bolts 10 or the like are the vertically spaced bearing plates 11. Rotatably disposed through the plates 11 at a point between the members or beams 8 and 9 is a vertically disposed shank or shaft 12. The shaft 12 extends above and below the bearing plates 11 and the lower end portion of said shank or shaft 12 is secured to the head 14 of the fork 15.

Interposed between the head 14 and the lower bearing plate 12 is a thrust bearing 16. A collar 17 is threaded upon the upper end portion of the shank or shaft 12 and interposed between the collar 17 and the upper bearing plate 11 is a thrust bearing 16$^a$. The collar 17 upon requisite rotary adjustment around the shank or shaft 12 compensates for or takes up the wear in the bearings 16 and 16$^a$.

Rotatably supported by the fork 15 is a rear supporting wheel W, the rim 18 of which having disposed circumferentially therearound a continuous outstanding flange 19 preferably positioned at the transverse center of said rim. This flange 19 provides means to hold the wheel W against sidewise movement or skidding when the device is in transit.

The hub 20 of the wheel W has arranged therein the roller bearings 21 or other anti-friction means coacting with the rear wheel axle 22 so that said rear wheel W may rotate with a minimum of frictional resistance.

Connecting the side beams or members 1 of the frame F at a point rearwardly of the axle A is another transverse beam or member 23 and supported by said beam 23 and the supplemental rear beam or member 9 at opposite sides of the frame F are the longitudinally disposed members or beams 24.

Supported by the rear portions of the members or beams 24 are the upstanding end frames 25 comprised in a seat base and said frames have their upper members 25$^a$ connected by the members or bars 26 disposed transversely of the frame F. Each of the upper members 25$^a$ of an end frame is provided with a spring liner 27 to which is bolted or otherwise secured the lower section of an elliptical spring 28. The upper section of the spring 28 is bolted or otherwise secured to a liner 29 depending from the base 30 of the seat structure S. The seat structure S is preferably upholstered in such a manner whereby a person may occupy such seat structure with a maximum of comfort.

Bolted or otherwise secured to the rear portions of the side members or beams 1 of the frame F are the depending hangers 31 provided at their lower end portions with the bearings 32 through which are disposed and rotatably supported the outstanding and laterally directed spindles 33 carried by an arch member 34. The arch member 34 has its side arms or portions 35 forwardly disposed.

The side members or beams 1 in advance of the hangers 31 and in close proximity thereto also have bolted or otherwise secured thereto the depending hangers 36 provided at their lower ends with the bearings 37 in each of which is rotatably supported a spindle 38 extending outwardly and laterally from a second arch member 39. The side arms 40 of the arch member 39 are also forwardly directed and are of a length greater than the length of the side arms 35 of the arch member 34. The intermediate or base portions 41 and 42 of the arch members 34 and 39 respectively have operatively engaged with the opposite end portions thereof the bearings 43.

Each pair of bearings 43 substantially alined longitudinally of the frame F is carried by the opposite end portions of the side bar or beam 44. The side bars or beams 44 are two in number and the opposite end portions thereof are connected by the transversely disposed cross members 45. The bars and members 44 and 45 comprise a holding frame to which suitable agricultural implements are adapted to be engaged, such as lister plows, disc harrows and kindred implements and by raising or lowering the arch members 34 and 39, the implements carried by such frame may be vertically adjusted with respect to the ground so that the same may be elevated into an inoperative position or may be vertically adjusted to vary the extent of penetration of such implement or ground working member, as the occasions of practice may require.

The arch members 34 and 39 are adapted to have rocking or swinging movement in unison and in the same general direction and as herein embodied this corresponding movement of the arch members 34 and 39 is assured by the link or rod 46 connecting the end portions of the upstanding brackets 47 carried by the rear or pivoted end portions of the side arms 35 and 40 of the arch members 34 and 39, respectively.

Clamped or otherwise secured, as at 48, to the side arms 40 of the arch member 39 are the arms 49 substantially in parallelism and each of said arms at its forward end portion is provided with an upstanding arcuate rack 50. Each of the racks 50 is in mesh with a gear 51 keyed or otherwise secured to an end portion of a transversely disposed shaft 52 rotatably supported by the bearings 53 carried by the side members or beams 1 of the frame F. Upon requisite rotation of the shaft 52, the arch members 34 and 39 may be raised or lowered in accordance with the requirements of practice.

One end portion of the shaft 52 is provided with a worm wheel 54 in mesh with a worm gear 55 carried by the relatively short shaft 56. The shaft 56 extends longitudinally of the frame F and is positioned inwardly of the side member or beam 1 and is rotatably supported by the bearings 57 carried by the bracket 58 bolted or otherwise secured to the adjacent side member or beam 1.

The rear end portion of the shaft 56 is connected by a universal joint 59 with the forward end portion of a shaft 60 normally in longitudinal alinement with the shaft 56. The rear portion of the shaft 60 is disposed through and rotatably supported by a bearing block 61. The bearing block 61 is provided with diametrically disposed and substantially horizontal pins 62 slidably directed through plugs 63 threaded within the angular extremities of a supporting bracket or bearing stand 64 bolted or otherwise secured to the side member or beam 1.

Encircling each of the pins 62 and interposed between a plug 63 and an opposed face of the bearing block 61 is a coil spring 65, the tension of said spring being under control of the plug 63. The springs 65 constitute expansible members and operate to normally maintain the shaft 60 is neutral position or in alinement with the shaft 56.

Fixed to the shaft 60 rearwardly of the bearing block 61 is a friction disc 66 interposed between the friction discs 67 keyed to the transversely disposed driven shaft 68 rotatably supported by the bearings 69. When the shaft 60 is in neutral position, the disc 66 is out of contact with either of the discs 67 but by a slight rocking movement of the shaft 60 in the desired direction, said disc 66 may be brought into contact with either of the discs 67, whereby the shafts 60 and 56 may be caused to rotate in a direction to either raise or lower the arch members 34 and 39.

Loosely mounted on the driven shaft 68 between the friction discs 67 is a sleeve 70 provided with a depending bearing 71 through which is disposed an end portion of a short shaft 72, the opposite end portion of the shaft 72 being rotatably supported by a bearing 73 extending upwardly from the frame F or more particularly the transverse member or beam 23 hereinbefore referred to. The forward end portion of the shaft 72 is provided with an upstanding rock arm 74 provided with a longitudinally disposed slot 75 through which the rear end portion of the shaft 60 extends, said slotted portion of the rock arm 74 engaging within an annular groove 76 produced in the shaft 60. By this means, the requisite lateral movement may be imparted to the shaft 60 as required by imparting the desired rocking movement to the shaft 72.

The rear portion of the shaft 72 is provided with a depending rock arm 77 to the lower or free end portion of which is pivotally engaged an end portion of a rod or link 78. The link 78 extends inwardly and transversely of the frame F and has its opposite end portion in pivotal connection with an arm $a$ of a bell crank lever 79. The heel portion of the lever 79 is supported by the beam or member 23 for rocking movement about a vertically disposed fulcrum or pivot member 80.

Pivotally engaged with the second arm $b$ of the bell crank lever 79 is a rearwardly directed rod or link 81. The opposite end portion of the rod or link 81 is pivotally engaged with a depending ear or lug 82 carried by a sleeve 83 rotatably mounted on a shaft 84. The shaft 84 is supported by the outstanding bearings or brackets 85 bolted or otherwise secured to the cross member or beam 86 connecting the forward end portions of the members or beams 24 hereinbefore referred to.

Extending upwardly from the sleeve 83 is the forwardly directed foot pedal 87 and the rearwardly directed foot pedal 88. Each of these pedals 87 and 88 is positioned for convenient operation by the foot of a person occupying the seat structure S. Upon depression of the pedal 87, the disc 66 will be caused to engage a disc 67, whereby the arch members 34 and 39 will be caused to swing upwardly while depression of the second foot pedal 88 will cause said disc 66 to engage the second disc 67, resulting in a downward movement of the members 34 and 39.

The inner end portion of the driven shaft 68 is coupled, as at 89, to the guiding and reversing gear shaft 90 extending through and rotatably supported by the gear casing or housing 91. Carried by the shaft 90 within the gear casing or housing 91 is a gear 92 to be hereinafter more particularly referred to. The inner end portion of the gear 92 is provided with a bevel gear 93 meshing with the gears 94 carried by a spider 95 mounted on the gear shaft 90. The gears 94 each rotate about a spoke of the spider.

The spider 95 carries a brake drum 97 with which coacts a brake band 98, said drum being held against rotation by the band 98 when it is desired to reverse the tractor. The band 98 is provided with a hanger 99 which is secured within the gear casing or housing 91 by the bolt 100. Interposed between the hanger 99 and the head of the bolt 100 and encircling said bolt is a spring 101 which permits the brake band 98 to be self-adjusting.

One end portion of the band 98 is provided with a lug 102 bolted or otherwise secured to an edge wall defining an opening in the gear case and the opposite end portion of said band 98 has secured thereto a fork 103 which straddles a rock arm 104 and is pivotally engaged therewith through the instrumentality of a bolt 105. The arm 104 is carried by a shaft 106 constituting a brake shaft and clutch release, said shaft being rotatably supported by the gear casing or housing 91.

Fixed to the shaft 106 is a lug 107 which coacts with the clutch release arm 108, said coacting portion of the arm 108 being provided with a cam portion 108$^a$ whereby the lug 107 is caused to impart swinging movement to the arm 108. The arm 108 is substantially horizontally disposed and the major portion thereof is bifurcated to provide the substantially parallel members 109 which straddle the hub of the gear 96 and have their extremities pivotally engaged by the bolt 110 or the like with the inwardly disposed lug 111 carried by the gear casing or housing 91. The inner portions of the members 109 are operatively engaged by the trunnions 112 with a sleeve 113 freely mounted on the hub of the bevel gear 96, so that upon rocking movement of the arm 108, said sleeve will be caused to move in a direction longitudinally of the shaft 90.

Contacting with the sleeve 113 at equidistantly spaced points therearound are the inner end portions of the fingers 114, the opposite or outer end portions thereof being pivotally engaged at 115 to the brake drum 97. Disposed at a point in alinement with each of the fingers 114 is a transversely disposed pin or bolt 116 which is slidably disposed through the drum 97 and through the outstanding ears 117 carried by the clutch plates 118.

Surrounding each of the pins or bolts 116 is a coil spring 119 interposed between the side wall or body of the drum 97 and a stop 120 threaded upon said pin or bolt 116 inwardly of the adjacent finger 114, whereby the pin or bolt 116 is constantly urged outwardly. The tension of the spring 119 may be regulated or varied by proper adjustment of the stop 120 lengthwise of the pin or bolt 116.

Threaded through the outer or pivoted end portion of each of the fingers 114 is an adjusting screw 121 with the inner end of which contacts the adjacent end of a pin or bolt 116 and whereby the throw of the adjacent finger 114 may be regulated. Interposed between the adjacent clutch plates 118 are the clutch plates 122 slidably mounted upon the gear 92 and having their internal marginal portions toothed, as at 123, so that said plates 122 will rotate with said gear.

Normally the plates 118 and 122 are in frictional contact to assure the unitary rotation of the gear 92 and the brake drum 97 but when the shaft 106 is rotated to apply the brake band 98, the sleeve 113 will be moved inwardly as a result of the contact of the lug 111 with the cam 108$^a$ of the release clutch 108, resulting in the clutch plates 118 and 122 separating, so that the shaft 90 may be reversely rotated.

The structure hereinbefore referred to relative to the brake drum 97 is in duplicate and arranged upon the shaft 90 at opposite sides of the transverse center of the frame F but in reverse relation and the outer end portion of each of the shafts 106 has operatively engaged therewith a rod or link 124 which is also operatively engaged with an upstanding lever 125. The levers 125 are arranged adjacent each end of the seat structure S and the lower portion of each of said levers is pivotally engaged, as at 126, with an adjacent member or beam 24 so that said lever 125 may be conveniently manipulated by an occupant of the seat structure S. Through the proper manipulation of the levers 125 each of the gears 92 may be caused to rotate in unison in the same direction, either forward or backward, or may be independently reversed or controlled as the occasions of practice may necessitate and particularly when it is desired to effect a steering operation.

Each of the levers 125 has its upper portion moving between two spaced bars 127 comprised in an upstanding bracket 128, one of said bars being notched whereby the lever may be held in desired position and the lever is maintained in operative engagement with the notch through the medium of a spring 129 carried by the second bar, said spring permitting the desired swinging movement of the lever.

The central portion of the shaft 90 has fixed thereto a bevel gear 130 meshing with a gear 131 fixed to the stub shaft 132 extending forwardly and longitudinally of the frame F and rotatably supported thereby. The shaft 132 is in alinement with the driving shaft 133 of the motor M. The motor M is preferably of an internal combustion type and suitably mounted upon the forward portion of the frame F. The connection between the shafts 132 and 133 is under control of a sliding clutch 134 and said clutch is adapted to be shifted by the arm 135 depending from the slide 136. The slide 136 is provided in its upper face with a rack 137 with which coacts the spring pressed locking dog 138 whereby the slide is normally held against movement and in desired adjustment.

Pivotally engaged with the rear portion of the slide 136 is a rod or link 139 extending rearwardly of the frame F and operatively engaged with the upstanding lever 140 whereby the occupant of the seat may readily connect or disconnect the shafts 132 and 133. It will be understood that the clutch 134 is keyed to the shaft 133 for rotation therewith but capable of longitudinal movement thereof.

Each of the gears 92 is in driving connection through the medium of a pinion 141 with the inner end portion of a transversely disposed shaft 142 rotatably supported by the frame F. The opposite or outer end portion of the shaft 142 is provided with a pinion or gear 143 in mesh with an internal gear G carried by one of the traction wheels T and whereby the desired rotation of said wheel is accomplished. By requisite manipulation of the levers 140, the wheels T may be caused to operate in a manner to effect the desired travel of the machine and particularly in a manner to effect a sharp turn such as is necessary at the end of a row.

Loosely mounted on the driving shaft 133 is a bevel gear 144 with which the clutch member 134 is adapted to engage when it is desired to cause said gear to rotate. The gear 144 is in mesh with a gear 145 carried by an end portion of a transversely disposed counter shaft 146 rotatably supported by the frame F. Keyed to the shaft 146 is a pulley 147 whereby the motor M may be employed to drive or operate machinery independently of the device at issue, such as a threshing machine or the like.

Pivotally engaged with the spindles 33 of the arch member 34 are the forwardly disposed arms 148 of a length to terminate a desired distance in advance of the frame F and the forward or free ends of said arms are provided with suitable fastening members 149 adapted to be bolted or otherwise secured under the front platform of a binder. Said arms at a desired distance inwardly of the fastening members 149 are also provided with the fastening members 150 adapted to be bolted or otherwise secured to the back of the platform rail of the binder. By this means, my improved device may be readily coupled to a binder for transporting the same. While I specifically refer to the arms 148 being adapted for connection with a binder, it is to be understood that the same can be coupled or hitched with equal facility to a header or kindred agricultural machinery.

The forward end portions of the arms 148 are connected by the transversely disposed cross members 151 which serve to maintain the forward end portions of said arms in desired spaced relation. One end portion of said cross members 151, and preferably the left end portions thereof, are provided with the upstanding bracket or bearing 152 which rotatably supports a longitudinally disposed shaft 153. The forward end portion of the shaft 153 has fixed thereto a sprocket 154 which is adapted to be placed in driving connection with a binder or header so that the mechanism thereof may be operated from the motor M. The inner end portion of the shaft 153 is operatively engaged through the medium of a universal joint 155 with a sleeve or socket 156 in which is slidably engaged in a conventional manner an end portion of a tumbler rod 157 extending upwardly and rearwardly on a predetermined inclination.

The upper or rear end portion of the tumbler rod 157 is operatively engaged through the medium of a universal joint 158 with a short horizontally disposed shaft 159 extending longitudinally of the frame F. The shaft 159 is rotatably supported within the lower portion of a gear casing or housing 160 suitably secured to the frame F. The rear portion of the shaft 159 is provided with a bevel gear 161 meshing with a gear 162 carried by the lower end portion of a vertically disposed shaft 163 rotatably mounted within the housing or casing 160. The upper end portion of the shaft 163 is provided with a bevel gear 164 meshing with a gear 165 carried by the adjacent or left end portion of the shaft 90.

Pivotally connecting each of the arms 148 and the forward end portion of an adjacent arm 49 is a hanger link 166 whereby the arms 148 may also be raised or lowered upon requisite rotation of the shaft 60 in the manner hereinbefore set forth.

Coacting with the forward end portions of each of the arms 148 is a balancing spring 167 suitably anchored at its lower end to an arm 148 and connected at its upper end portion to a vertically disposed bolt 168 loosely disposed through a hanger 169 bolted or otherwise secured to the forward end portion of a side member or beam 1 of the frame F. Threaded upon the bolt 168 and contacting with the upper end portion of the hanger 169 is a nut 170 and which nut, upon requisite rotation around the bolt 168, operates to adjust the tension of the spring 167. The springs 167 serve to relieve the arch member 39 of the weight of the arms 148 and the parts carried thereby.

Mounted upon the shaft 84 is a pedal 171 positioned for convenient manipulation by the foot of an occupant of the seat structure S and operatively engaged with said pedal 171 is a rod 172 adapted for operative connection with the clutch (not shown) of the motor M.

At one side of the seat structure S is arranged the lever 173 operating in a conventional manner to control the combustible mixture to the motor M and at the opposite side of said structure S is a spark lever 174 operating in a well known manner. As the mechanism under control of the levers 173 and 174 forms no part of my present invention, it is not believed necessary that a detailed description and illustration thereof be given, although it might be well to state that the motor M is preferably of the well known Wakasha type.

The rear portion of the frame F is provided with the upstanding posts 175 which support a top 176, said top serving as a protection to the occupant of the seat structure S.

From the foregoing description it is thought to be obvious that a tractor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising a portable body, a supporting structure carried thereby and including arch members connected for unitary movement and supported by the frame for vertical swinging movement, a driven shaft, means for reversely rotating said shaft at will, and an operative connection between said shaft and one of said arch members for imparting swinging movement thereto in either direction, said operative connection including an upstanding arcuate rack carried by the arch member and a gear carried by the shaft and in mesh with the rack.

2. A machine of the class described comprising a portable frame, a pair of arch members carried thereby and including spindles rotatably engaged with the frame, means for causing said arch members to swing in unison and in the same general direction, means for imparting swinging movement to said arch members in either direction, arms having similar end portions pivotally engaged with the spindles of one of the arch members and extending forwardly of the frame, and links operatively connecting said arms and the second arch member, said arms constituting a hitch structure.

3. A machine of the class described comprising a portable frame, a pair of arch members carried thereby and including spindles rotatably engaged with the frame, means for causing said arch members to swing in unison and in the same general direction, means for imparting swinging movement to said arch members in either direction, arms having similar end portions pivotally engaged with the spindles of one of the arch members and extending forwardly of the frame, links operatively connecting said arms and the second arch member, said arms constituting a hitch structure, a driving element carried by said arms, and means carried by the frame for operating said driving element.

4. A machine of the class described comprising a portable body, a supporting structure carried thereby and including arch members connected for unitary movement and supported by the frame for vertical swinging movement, a driven shaft, means for reversely rotating said shaft at will, and an operative connection between said shaft and one of the arch members for imparting swinging movement thereto in either direction.

5. A machine of the class described comprising a portable body, a supporting structure carried thereby and including arch members connected for unitary movement and supported by the frame for vertical swinging movement, a driven shaft, an operative connection between said shaft and one of said arch members for imparting swinging movement thereto in either direction, said operative connection including an upstanding arcuate rack carried by the arch member, and a gear carried by the shaft and in mesh with the rack.

6. A machine of the class described comprising a portable frame, a pair of arch members carried thereby and including spindles rotatably engaged with the frame, means for causing said arch members to swing in unison and in the same general direction, means for imparting swinging movement to said arch members in either direction, arms having similar end portions pivotally engaged with the spindles of one of the arch members and extending forwardly of the frame, and an operative connection between said arms and the second arch member.

7. A machine of the class described comprising a portable body, a supporting structure carried thereby and including a pair of arch members supported by the frame for vertical swinging movement, said arch members being positioned one in advance of the other, the side arms of one member being of a length greater than the side arms of the second member, a frame connecting the intermediate portions of the arch members for unitary movement, and means for imparting vertical swinging movement to the arch members in either direction.

8. A machine of the class described comprising a portable frame, a pair of arch members carried thereby and rotatably engaged therewith, means for causing said arch members to swing in unison and in the same general direction, means for imparting swinging movement to said arch members in either direction, arms having similar end portions pivotally engaged with one of the arch members and extending forwardly of the frame, an operative connection between said arms and the second arch member, and balancing means associated with the forward portions of said arms.

9. A machine of the class described comprising a portable frame, a pair of arch members carried thereby and rotatably engaged therewith, means for causing said arch members to swing in unison and in the same general direction, means for imparting swinging movement to said arch members in either direction, arms having similar end portions pivotally engaged with one of the arch members and extending forwardly of the frame, an operative connection between said arms and the second arch member, and means associated with the forward end portions of the arms for relieving the arch members from the weight of said arms.

In testimony whereof I hereunto affix my signature.

JACOB YOUNG.